Nov. 10, 1931.  A. B. CLARK  1,831,227
RAIL JOINT
Filed Dec. 15, 1930  4 Sheets-Sheet 1
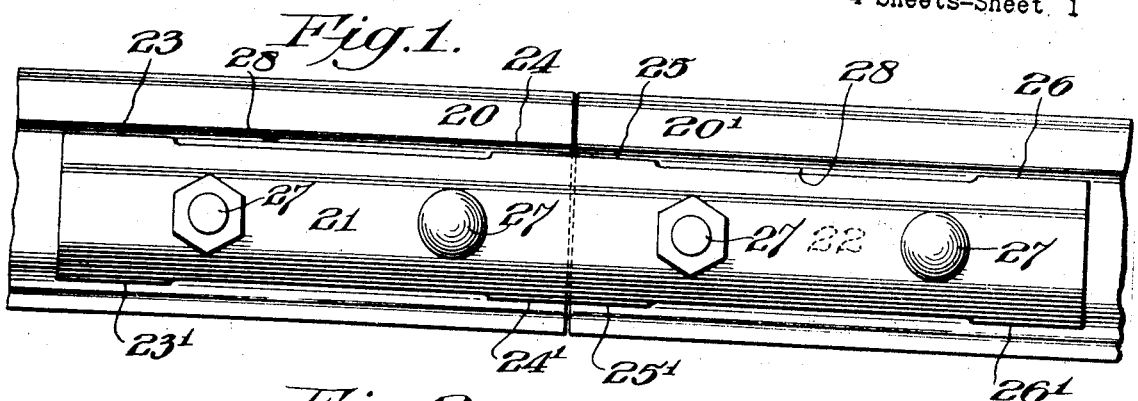
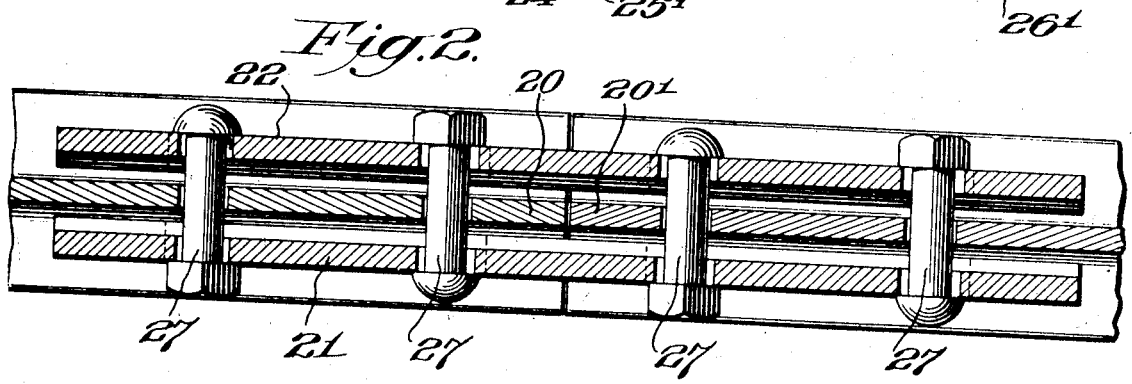
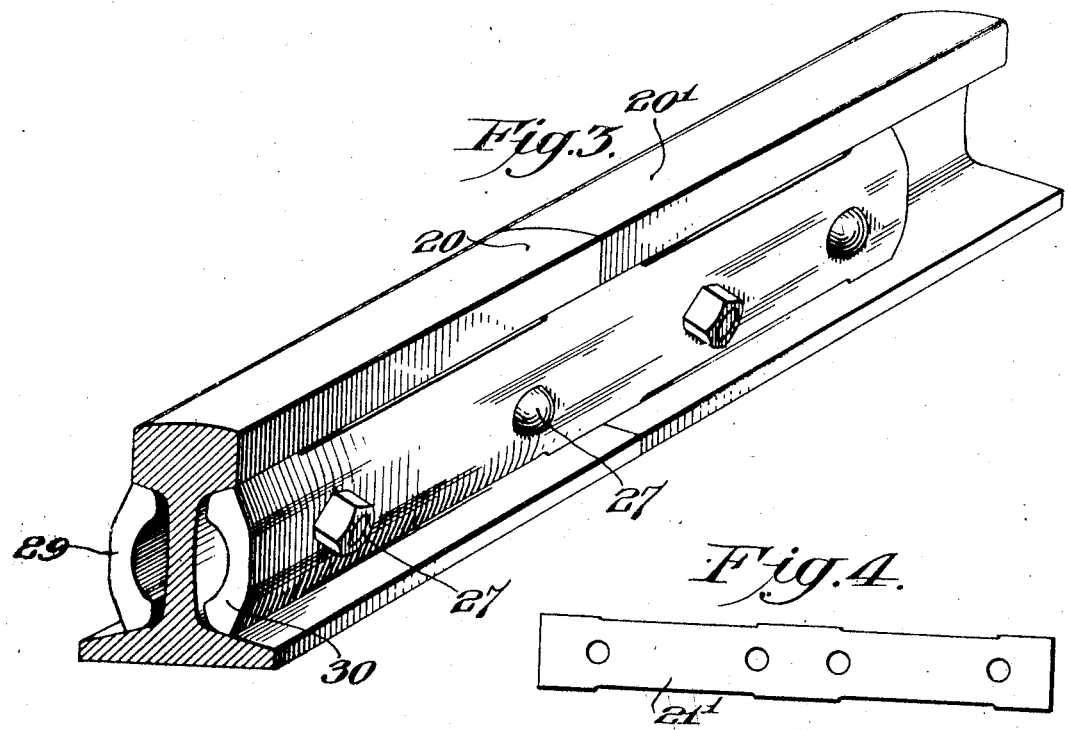
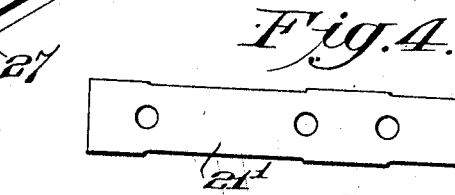
Inventor
Arthur B. Clark,
Attorney

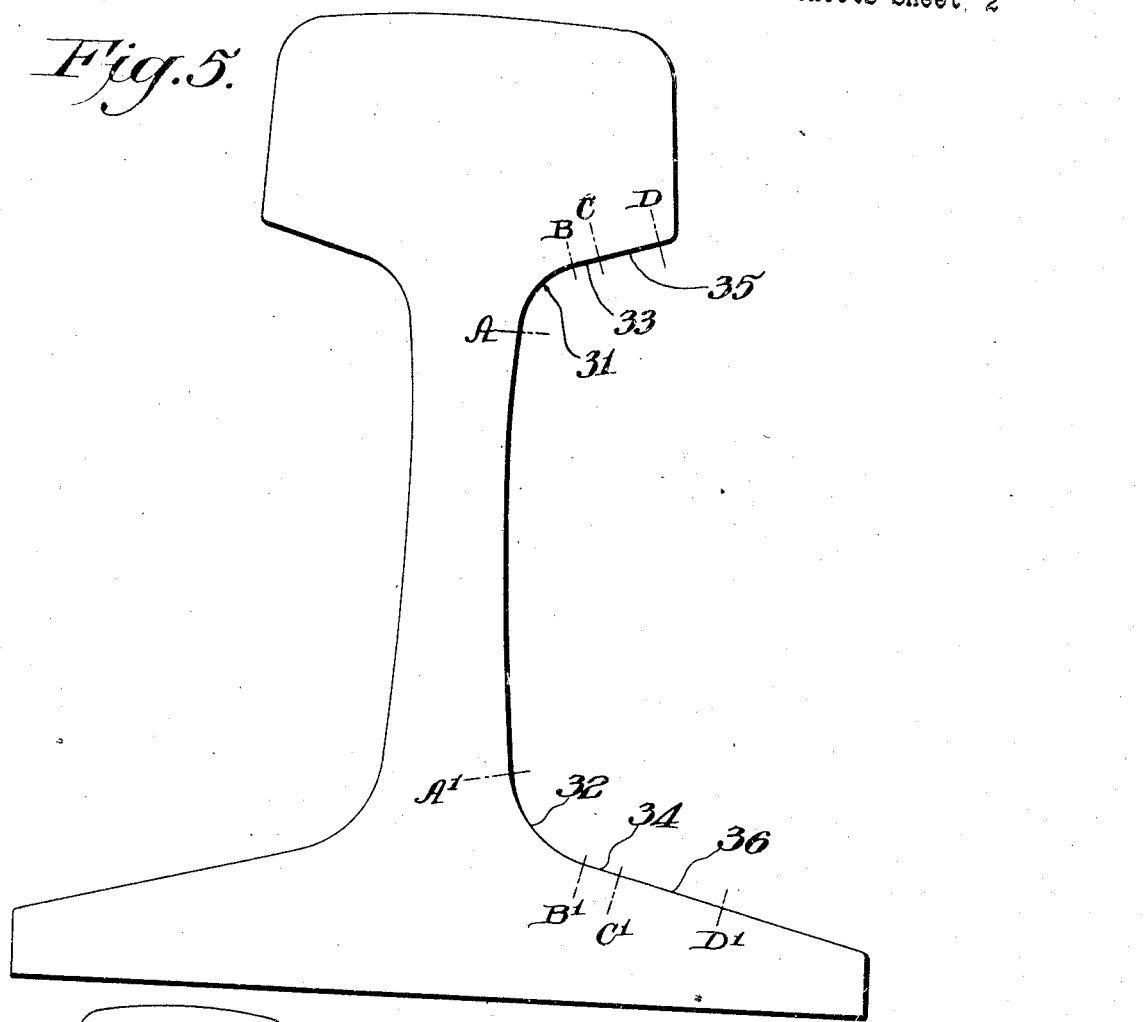
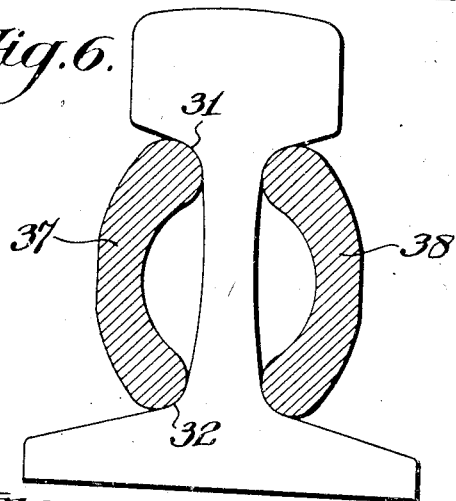
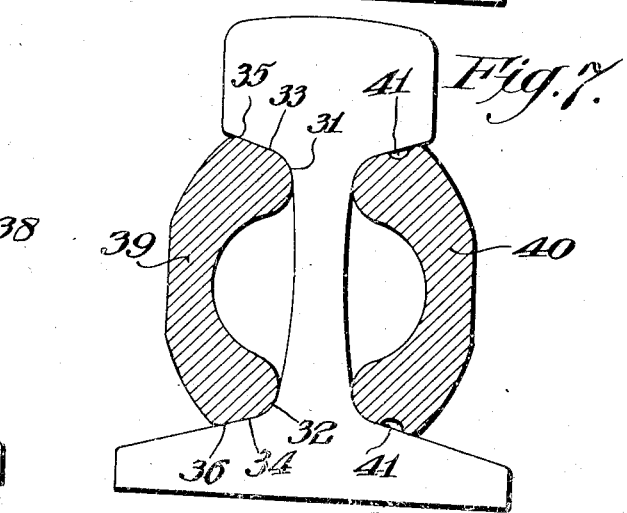

Nov. 10, 1931.  A. B. CLARK  1,831,227
RAIL JOINT
Filed Dec. 15, 1930  4 Sheets-Sheet 3

Witnesses:

Inventor
Arthur B. Clark,
By
Attorney.

Nov. 10, 1931.  A. B. CLARK  1,831,227
RAIL JOINT
Filed Dec. 15, 1930  4 Sheets—Sheet 4
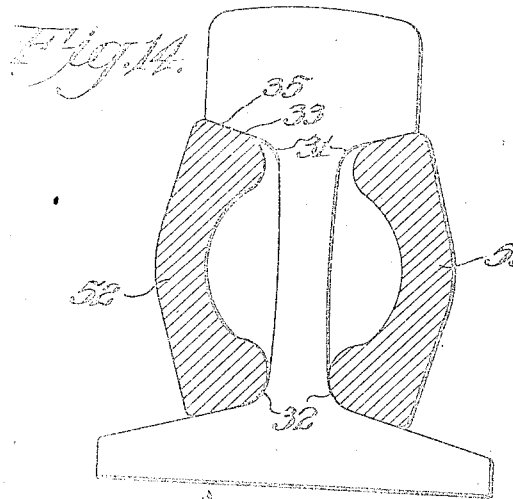
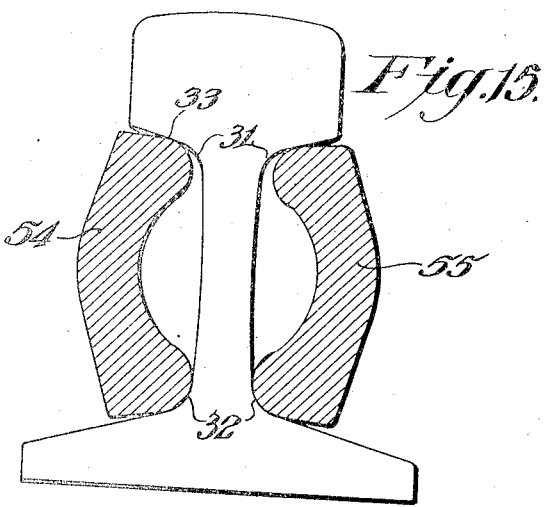
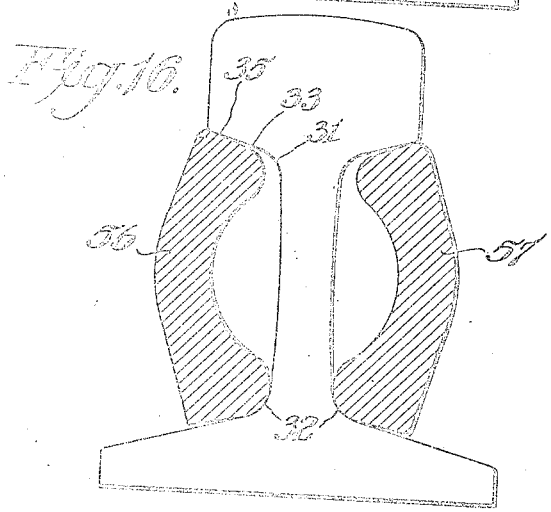
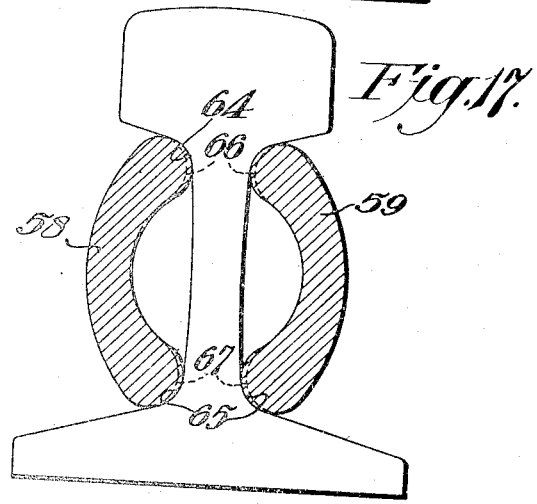
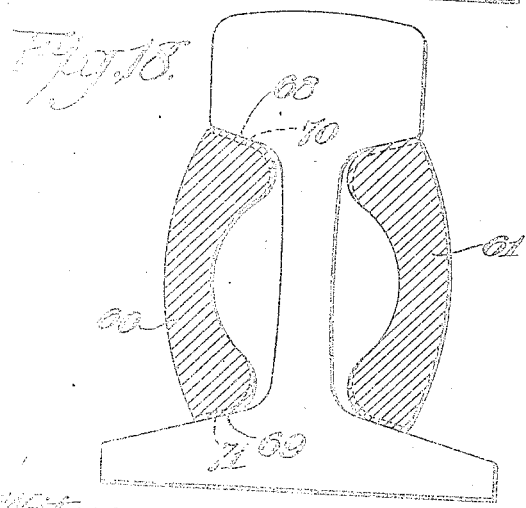
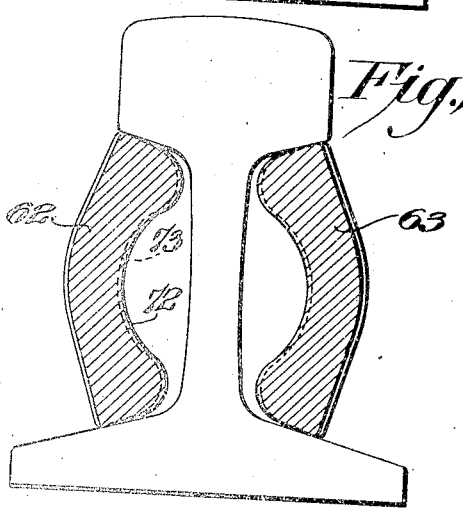
Inventor
Arthur B. Clark,
By
Attorney.

Patented Nov. 10, 1931

1,831,227

UNITED STATES PATENT OFFICE

ARTHUR B. CLARK, OF TRENTON, NEW JERSEY

RAIL JOINT

Application filed December 15, 1930. Serial No. 502,378.

My invention relates to joints for rail ends as used in track service.

One purpose of the invention is to secure the combined advantages of outwardly bowed transverse splice bar section and splice bar contact with the rails at spaced intervals only.

A further purpose is to concentrate splice bar pressure against rail ends at the joint by reducing the contact areas and to use the higher pressures secured to vertically spread an outwardly bowed bar web.

In spaced-contact splice bar and rail joint construction a further purpose is to use a transversely bowed splice bar section to secure bar stiffening at points longitudinally between the splice bar and rail contact areas and to spread the bar against the rail where these contacts take place by the pressure exerted through the bolts.

Further purposes will appear in the specification and in the claims.

I have preferred to illustrate my invention by a number of forms for the purpose of emphasizing the broad suitability of the invention for use with a great variety of fishing conditions, showing the invention to be substantially independent of the character of engagement between the bar and rail and of the means by which spacing of bar and rail contacts is effected and without any thought of attempt to illustrate all the forms in which it may be used.

Figure 1 is a fragmentary side elevation of a rail joint embodying my invention.

Figure 2 is a transverse section in position corresponding to a central section of Figure 1, showing one structure which may be used in Figure 1.

Figure 3 is a section perspective of a joint showing an outwardly bowed splice bar such as might be used in Figure 1.

Figure 4 is a side elevation of a splice bar differing from that shown in Figures 1, 2 and 3.

Figure 5 is a transverse section of a rail joint used for illustrative purposes.

Figures 6-16 are transverse sections of splice bars in position about end rail elevations intended to illustrate the fact that my invention is applicable to an indefinitely large variety of bar and rail contact conditions.

Figures 17-19 are transverse sections corresponding with Figures 6-16, but for the purpose of showing variations in the means of effecting bar contact with the rails at spaced points.

In the drawings similar numerals indicate like parts.

Figure 8:
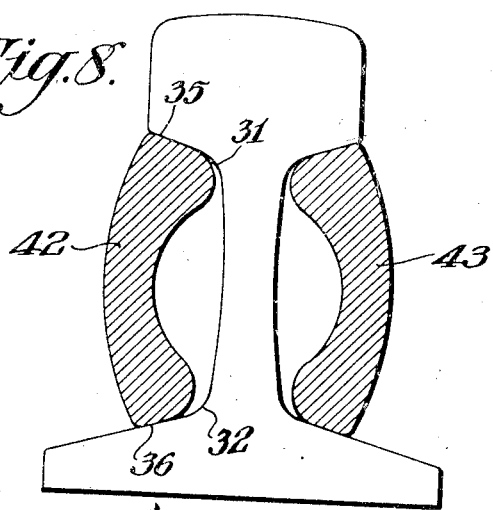

My invention is directed to a joint structure in which the splice bars do not engage with the rails continuously throughout the lengths of the splice bars but engage at longitudinally spaced points only and in which a bowed bar section can be spread by bolt pressure transverse to the bar, securing all of the advantages of transverse bar spreading along with the concentration of pressure due to the spacing of the bar-and-rail contacts.

As Figure 1 is a side elevation and is intended to show longitudinally spaced contacts, that form of bar relief between the contacts has been shown which can be seen in such a view, namely, by reducing the height of the bar between contacts at the top and the depth at the bottom. The views are intended, however, to be diagrammatic and it is not intended to indicate that the bars of these figures must secure the spacings of their contacts by such a character of relief. Quite a number of different means is now available.

The rails 20, 20' and bars 21, 22 are shown in Figure 1 as making contact at 23, 24, 25 and 26 at the top and 23', 24', 25' and 26' at the bottom due to the pressure of bolts 27. No contact is made along the intermediate sections 28.

For simplicity the four-bolt joint is shown notwithstanding that the invention can, of course, be used in a joint using more bolts.

Each of the splice bars may be of any bowed transverse section and type of contact, of which quite a number are hereinafter illustrated and of which 29, 30 are taken in Figure 3 as typical. Because of the outward bowing of the cross-section pressure of the bolts will have a tendency to bend (straighten) the web and to increase the width (height) of the bars.

It is recognized that the total amount of transverse bending, and therefore the transverse increase of slice bar height, will be very small, but that in a rail joint the differences between effective contact and poor contact represent a very slight difference in splice bar height.

In Figures 1, 2 and 3 the bolts are placed in positions which, longitudinally of the splice bars, lie between the contacts 23 and 24 at the one end and 25 and 26 on the other.

Since transverse bending, and therefore vertical stretching of the splice bars does not become effective except as the bowed section meets resistance, the transverse bending in Figures 1-3 will be concentrated at those portions of the lengths of the bars where the top and bottom contacts occur. The bowed structure in between the contact points will therefore not be bent except as they may be a tendency to flex the bars bodily opposite the bolts as would be true of any bars which are unsupported within this section. The transversely bowed character of the bars, however, greatly stiffens them against such lateral bending away from the planes of the length of the bars because the bowed sections act as beams.

The pressure of the bolts in Figures 1-3 is transmitted with great advantage through the beam-like portions which do not engage the rail to those portions of the bars which are in contact with the rail heads and flanges respectively, concentrating the pressure at these points of reactive restraint of the tops and bottoms of the bars by the rail heads and flanges and making the pressure much more effective than would be the case where the bars are in contact with the rail throughout the bar lengths.

In the form of Figure 4, differing in this from Figures 1-3, the bolt holes are located transversely between points of engagement between the bars and rails, reducing the need of beam action in the supported bar sections between the bolt holes because the bolts more directly bear upon the portions of the bars with which rail contact is made.

In Figure 5, for reference purposes, I have designated parts of the fishing surfaces of the rail 32 beneath the head and above the flange by different characters in order to indicate more easily than would otherwise be the case the complete independence of my present invention of the points of engagement of splice bars with the rail heads and flanges. For this purpose the rail shown is taken as typical of the widely variant rail sections which are in use, in that within its fishing contour this rail has fillet surfaces 31 and 32 which for present purposes are indicated as extending between lines A and B, A', B'; inner fishing head and flange surfaces 33 and 34 which for present purposes may be indicated as lying between lines B and C, B' and C'; and outer fishing head and flange surfaces 35 and 36 which are indicated as extending between points C and D, C' and D'.

It is my purpose to show engagements, initially or ultimately with these different surfaces so as to point out the suitability of my invention for use in any variations of initial contact or drawing engagement with these several different surfaces. Elsewhere the suitability for use with splice bars having different characters of relief between contact points will also be pointed out.

In Figures 6 and 7 fillet-bearing splice bars 37 and 38, 39 and 40 are shown having initial engagement of the bars with the fillet surfaces 31 and 32 alone in Figure 6 and either initially or ultimately (when transversely expanded) having engagement of bars 39 and 40 with one or both of surfaces 33 and 34 or/and 35 and 36. At 41 in bar 40 the head and base of the bar are relieved to indicate that contact may be had with surfaces 35 and 36 while avoiding contact with surfaces 33 and 34. The extent of surface engaged by bar 39 depends upon the extent to which the contour of the head and base of the bar follow that of the head and flange of the rail. With the disclosure herein this can be varied by the designer.

Figure 9:
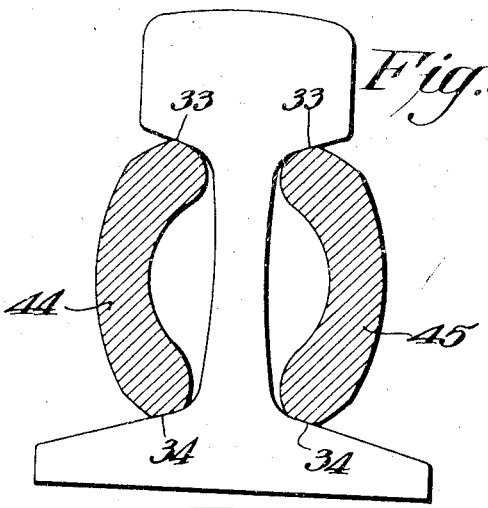
Figure 10:
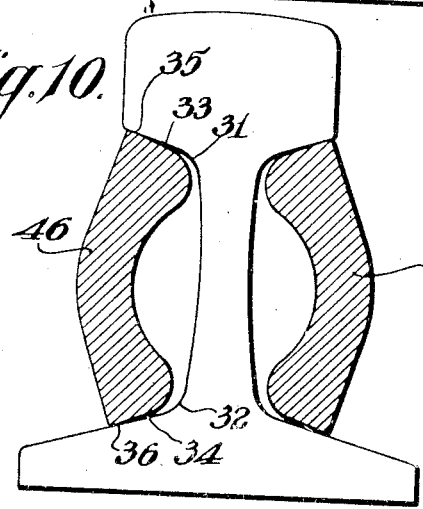

In Figures 8 and 9 initially, and in Figure 10 after pressure is applied to the bowed splice bars, the bars 42 and 43, 44 and 45, 46 and 47 are intended to make contact with surfaces 33 and 34 of the rail, allowing both top and bottom of the bar fishing space to move inwardly.

In Figure 8 the initial section of contact includes also the surfaces 35 and 36 of the rail and in Figure 10 the contact starts at surfaces 35 and 36 and is intended to continue over all or part of surfaces 33 and 34 of the rail after part of the bowing of the splice bar has been taken out by pressure of the bolts. The splice bars of these figures, therefore, have in common a fishing range inwardly at both upper and lower edges of the bar, as well as the bowing of the bar.

Figure 11:
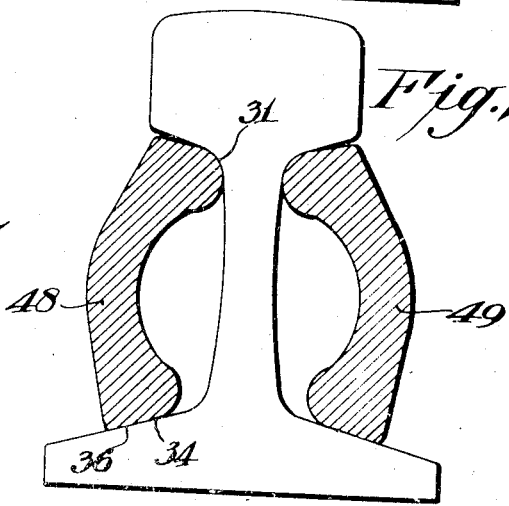
Figure 12:
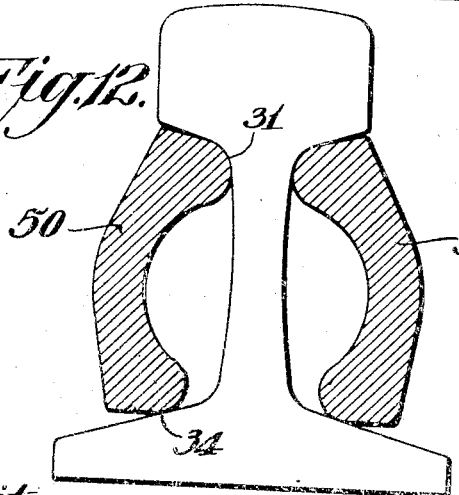
Figure 13:
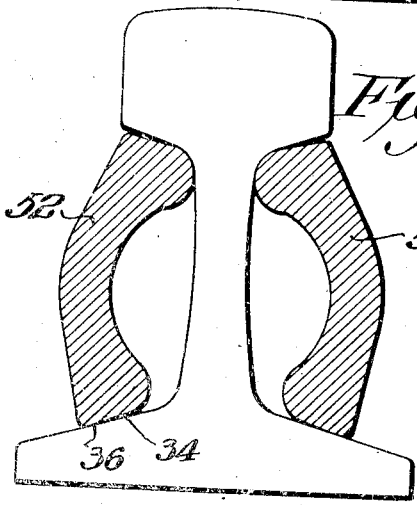

In Figures 11, 12 and 13 bars 48 and 49, 50 and 51, 52 and 53 have the same general relation in their fishing contacts and movements as the bars in Figures 8, 9 and 10 with the difference, however, that bars 48-53 all engage initially in the fillets between the rail heads and webs, namely in spaces 31, being of what is called familiarly a head-free type. The lower flanges of the bars may make fishing contact corresponding with that of both ends in Figures 8, 9 and 10, namely initially engaging a large part of surfaces 34 and 36 in Figure 11, initially and finally engaging surface 34 only in Figure 12 and initially engaging surface 36 only with subsequent expansion into contact with surface 34 also in Figure 13.

In Figures 14, 15 and 16 conditions are reversed as compared with Figures 11, 12 and 13 in that the lower flanges of the splice bars 52 and 53, 54 and 55, 56 and 57 make contact with the fillets 32 between rail flanges and rail webs and the fishing surfaces are wholly at the top, corresponding in the fishing engagements at the top in these figures with the fishing engagements at the bottom in Figures 11, 12 and 13. Thus in Figure 14 there is initial engagement over a considerable range of surfaces 33 and 35; engagement initially and finally with surface 33 only in Figure 15; and initial engagement under the outer part of the rail head with ultimate engagement with surfaces 33 and 35 when the pressure has been applied in Figure 16.

In all of the forms it will be evident that any cross section of splice bar may be used with or without enlarged flanges, or with the flanges, where of considerable size, of any desired shape, provided the transverse web section be such that lateral pressure will tend to straighten out and vertically expand the bar; and that any character of rail may be used.

The portions of contacting surface set out in the fishing space of the rail in Figure 5 have been adopted for convenience of description there and in the other figures and are not intended to have any hard and fast limits of sub-division.

The discussion and illustration are intended to show the applicability of my combined spaced contact and outwardly bowed bar section to bars of whatever other characteristic and wherever or in whatever relation they engage with the rail head and flange or the surfaces of the fillets at the juncture of the head and flange with the rail web.

Whatever the type of contact and however the spacing of contact is effected the support of the rail head is improved by transverse straightening of the bar section.

In order not to appear to restrict the means of relief of the splice bar from contact with the rail head and rail flange throughout portions of the lengths of the bars to one type of means, such as might otherwise be suggested by the illustrations in Figures 1, 3 and 4, I have shown three well-known forms by which contact of the head and base of the bar at intervals only along the length of the rail may be had, selecting these three among quite a number of recognized forms because of their simplicity. These are shown in Figures 17, 18 and 19 using bars 58 and 59, 60 and 61, 62 and 63. The sections are taken through points of contact of the heads and bases of the bars with the head and flange of the rail.

The portions of the bars which do not engage with the rail are shown in dotted lines.

It is not intended to suggest that the contacts of the bars with the rail at head and flange need be opposite each other.

In Figure 17 the lateral surfaces of the heads and bases of the splice bars 58 and 59 have been projected at 64 and 65—the intermediate portions relatively pushed back at 66 and 67—so that all of the deformation of the bar is lateral and takes place at the heads and bases.

In Figure 18 the deformation of the contours of bars 60 and 61 is almost wholly vertical, the portions 68 and 69 which engage the rail head and flange being higher and lower respectively, than the intermediate non-engaging portions 70 and 71.

It will be seen in Figure 18 that the deformation of the bar contour is confined to the head and base flanges.

In Figure 19 the bars 62 and 63 have been warped laterally throughout the entire heights of the bars, giving an effect generally similar to that in Figure 17, but extending the surfaces 72 of the bars inwardly toward the web of the rail throughout the entire inner sides of the splice bars to a greater extent than the intermediate portions 73 of the splice bars.

In all of these forms it will be seen that the pressure upon the portions of the splice bars which engage with the rail heads and flanges is greatly increased per unit area by reducing the areas of contact and that the increase of pressure accentuates the normal spread in height due to comparative straightening of the bowed transverse sections in contact with the rail.

It will be evident that the outer surfaces of the splice bars may be flattened slightly to receive the bolt heads and washers as in Figures 6 and 7, or may be curved in transverse outer contour as in the remainder of the figures, each having advantages, the flat form increasing the area of the bolt head or washer in contact with the splice bar surface and the curved form in maintaining substantially the same extent of contact without regard to tilting of the splice bar in vertical transverse planes.

Though in Figures 8, 9 and 10 I have shown the engagement as the same type of top and bottom it will be evident that this is not necessary as the engagement may be different at the top from that at the bottom.

In view of my invention and disclosure variations and modifications to meeet individual preference or particular need will doubtless become evident to others skilled in the art, to obtain all or part of the benefits of my invention without copying the structure shown, and I, therefore, claim all such in so far as they fall within the reasonable spirit and scope of my invention. Having thus described my invention what I claim as new and desire to secure by Letters Patent is:

1. In a rail joint, a pair of rail ends, a pair of splice bars engaging the rail ends at intervals along the lengths of the splice bars and having outwardly bowed splice bar web cross-sections and bolts holding the splice bars tightly in position to engage with the rails.

2. In a rail joint, a pair of rail ends, a pair of splice bars engaging the rail ends at intervals along the lengths of the splice bars and having outwardly bowed splice bar web cross-sections and bolts holding the splice bars tightly in position to engage within the fishing spaces of the rails, the bolts being located in cross-sectional line with points of contact of the splice bars with the rails.

3. In a rail joint, a pair of rail ends, a pair of splice bars engaging the rail ends at intervals along the lengths of the splice bars and having outwardly bowed splice bar web cross-sections and bolts holding the splice bars tightly in position to engage within the fishing spaces of the rails, the bolts being located as respects the length of the splice bars between points of engagement of the splice bars with the rails.

4. In a rail joint, a pair of rail ends, a pair of splice bars engaging the rails within their fishing spaces immediately at the joint, close to the joint and at the ends of the splice bars and free from engagement therebetween, the splice bars being outwardly bowed in cross-section and bolts through the splice bars and rails in those portions of the lengths of the splice bars free from contact with the rail.

5. In a rail joint, a pair of rail ends, a pair of splice bars engaging the rails within their fishing spaces immediately at the joint, close to the joint and at the ends of the splice bars and free from engagement therebetween, the splice bars being outwardly bowed in cross-section and bolts through the splice bars and rails in those portions of the lengths of the splice bars having engagement with the rails.

6. In a rail joint, a pair of rail ends, a pair of transversely outwardly bowed splice bars having flanges engaging the rail ends at points opposite, top and bottom, and at intervals throughout the lengths of the splice bars and bolts tightening the splice bars against the rail heads at points of contact to accentuate the pressure at the contact sections to tend to straighten out the bars against the rail.

7. In a rail joint, a pair of rail ends, a pair of transversely outwardly bowed splice bars engaging the rail ends at intervals throughout the lengths of the splice bars and bolts tightening the splice bars against the rails at intervals of contact to accentuate the pressure at the contact sections to tend to straighten out the bars against the rail, the splice bar making engagement at top and bottom with the fillets between the rail webs and the heads and flanges of the rails.

8. In a rail joint, a pair of rail ends, a pair of transversely outwardly bowed splice bars engaging the rail ends at intervals throughout the lengths of the splice bars and bolts tightening the splice bars against the rails at intervals of contact to accentuate the pressure at the contact sections to tend to straighten out the bars against the rail, the splice bar making engagement at top or bottom with the fillets between the rail webs and the heads and flanges of the rails and at the other edge with the flanges or webs of the rails.

9. In a rail joint, a pair of rail ends, a pair of transversely outwardly bowed splice bars engaging the rail ends at intervals throughout the lengths of the splice bars and bolts tightening the splice bars against the rails at intervals of contact to accentuate the pressure at the contact sections to tend to straighten out the bars against the rail, the splice bars having fishing ranges with both the rail heads and the rail flanges.

10. In a rail joint, a pair of rail ends, a pair of transversely outwardly bowed splice bars engaging the rail ends at intervals throughout the lengths of the splice bars and bolts tightening the splice bars against the rail at longitudinal intervals of contact to accentuate the pressure at the contact sections to tend to straighten out the bars against the rails, the splice bars having fishing ranges with both the rail heads and the rail flanges initially engaging with a laterally small part only of the fishing spaces of the heads and flanges of the rail.

11. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, the splice bars having fishing ranges with both the rail heads and rail flanges initially engaging with outer parts of the heads and flanges within the fishing space and with pressure increasing the extent of engagement with the heads or/and flanges.

12. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, the splice bar engagements with the rails pivoting within a rail fillet at one flange of the splice bar and fishing at the other flange of the bar.

13. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, the splice bar engagements with the rails pivoting within a rail fillet at one flange of each of the splice bars and fishing at the other flanges of the bars, the upper flanges of the splice bars effecting the pivot.

14. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, the splice bar engagements with the rails pivoting within a rail fillet at one flange of the splice bar and fishing at the other flange of the bar, the lower flange of the splice bar forming the pivot.

15. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, and the fishing flanges of the splice bars initially engaging but little with the rails.

16. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, the fishing flange of the splice bars initially engaging at their outer surfaces with the rails and increasing their engagements with transverse straightening of the splice bars.

17. In a rail joint, a pair of rail ends, a pair of transversely outwardly bowed splice bars engaging the rail ends at intervals throughout the lengths of the splice bars and bolts tightening the splice bars against the rails at longitudinal intervals of contact to accentuate the pressure at the contact sections to tend to straighten out the bars against the rails, the fishing flange of the splice bars initially engaging with the rails throughout wide ranges within their fishing spaces.

ARTHUR B. CLARK.